United States Patent [19]
Cech et al.

[11] Patent Number: 6,056,079
[45] Date of Patent: May 2, 2000

[54] AUTOMOTIVE SEAT WEIGHT SENSING SYSTEM

[75] Inventors: Leonard S. Cech, Strongville, Ohio; Michael P. Bruce; Michael E. O'Boyle, both of Brighton, Mich.

[73] Assignee: Automotive Systems Laboratory, Inc., Farmington Hills, Mich.

[21] Appl. No.: 09/003,672

[22] Filed: Jan. 7, 1998

Related U.S. Application Data

[60] Provisional application No. 60/034,018, Jan. 8, 1997.

[51] Int. Cl.[7] .............................. B60N 2/24; B60R 21/01
[52] U.S. Cl. ..................... 180/273; 280/735; 340/667; 297/217.2
[58] Field of Search ................... 280/735, 732, 280/730.1; 180/273; 340/667, 666; 297/217.2

[56] References Cited

U.S. PATENT DOCUMENTS

| | | | |
|---|---|---|---|
| 1,969,929 | 8/1934 | Heden | 180/273 |
| 4,022,146 | 5/1977 | Sadler | 115/76 |
| 4,056,156 | 11/1977 | Dayton | 177/209 |
| 4,336,533 | 6/1982 | Wettach | 340/666 |
| 4,456,084 | 6/1984 | Miller | 177/141 |
| 4,644,597 | 2/1987 | Walker | 5/449 |
| 4,722,550 | 2/1988 | Imaoka et al. | 280/727 |
| 4,908,895 | 3/1990 | Walker | 255/453 |
| 4,957,286 | 9/1990 | Persons, II et al. | 272/73 |
| 4,987,898 | 1/1991 | Sones | 128/645 |
| 5,074,583 | 12/1991 | Fujita et al. | 280/735 |
| 5,184,112 | 2/1993 | Gusakov | 340/666 |
| 5,232,243 | 8/1993 | Blackburn et al. | 280/735 |
| 5,474,327 | 12/1995 | Schousek | 280/735 |
| 5,606,516 | 2/1997 | Douglas et al. | 364/571.04 |
| 5,877,677 | 3/1999 | Fleming et al. | 280/735 |
| 5,904,219 | 5/1999 | Anahid et al. | 280/735 |
| 5,918,696 | 7/1999 | VanVoorhies | 280/735 |
| 5,927,427 | 7/1999 | Sewell et al. | 280/735 |

*Primary Examiner*—Peter C. English
*Attorney, Agent, or Firm*—Lyon, P.C.

[57] ABSTRACT

A plurality of hydrostatic weight sensors, each incorporating a fluid and a pressure sensor for sensing the pressure thereof, are incorporated in a vehicle seat to sense occupant weight, position, and stature. In one aspect, a hydrostatic weight sensor is located in the seat back and a separate hydrostatic weight sensor is located in the seat bottom. In another aspect, a plurality of laterally or longitudinally proximate hydrostatic weight sensors, or a single bladder with a plurality of chambers, is incorporated in the seat bottom to sense occupant position. In another aspect, a hydrostatic seat weight sensor is provided by forming a fluid filled cavity within a seat cushion and sensing the pressure of the fluid therein. A signal processor calculates the occupant weight, position, and stature from the respective pressure sensor output signals and controls a safety restraint system responsive thereto.

15 Claims, 5 Drawing Sheets

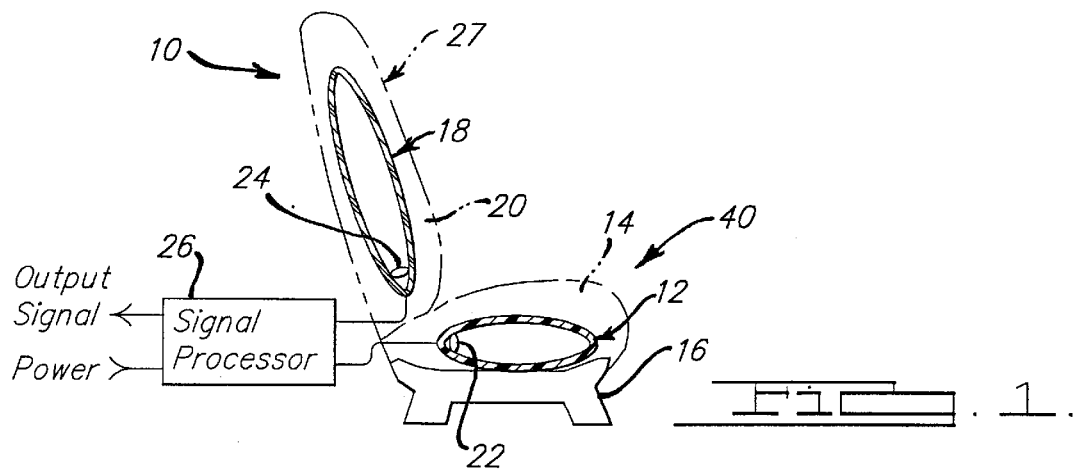
FIG. 1.
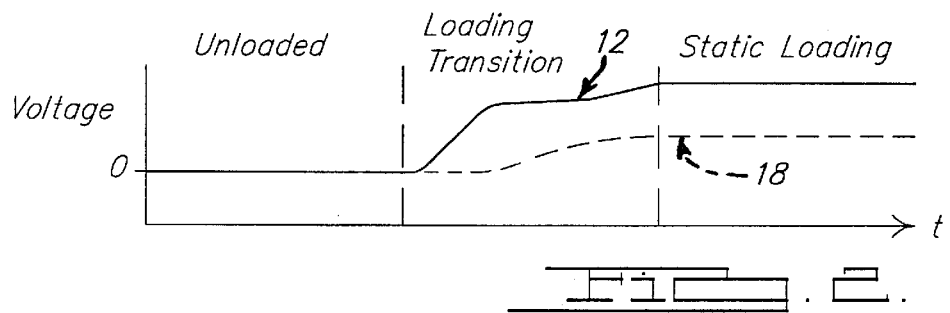
FIG. 2.
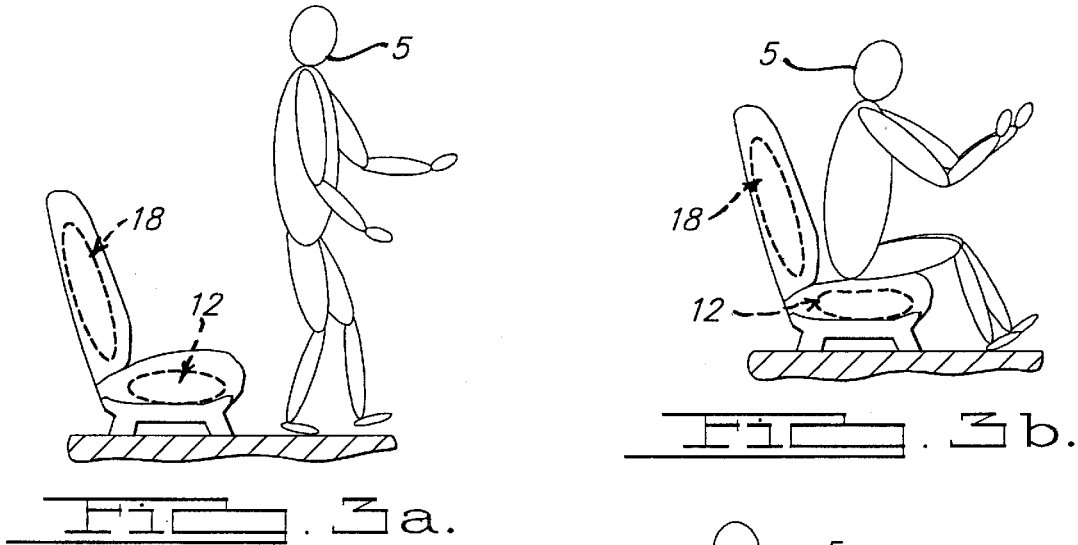
FIG. 3a.
FIG. 3b.
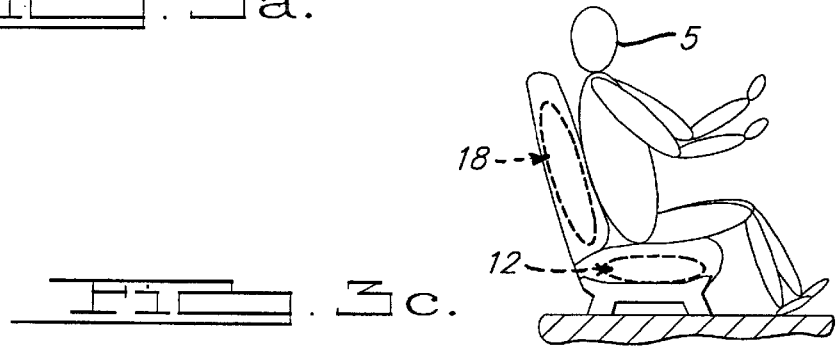
FIG. 3c.

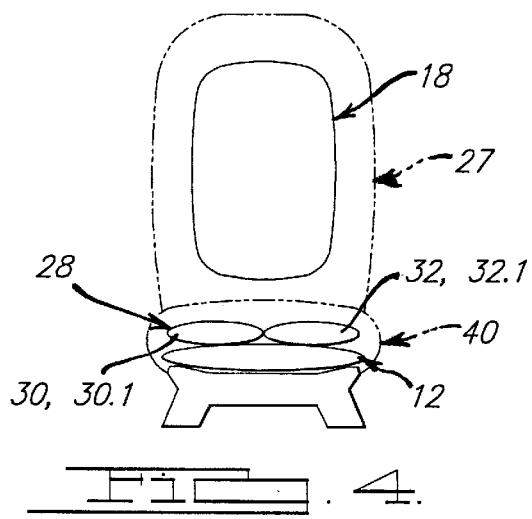
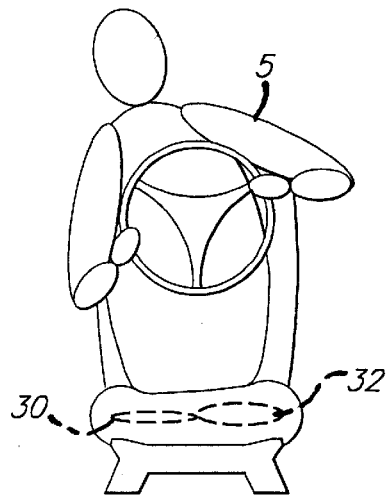
FIG. 4.    FIG. 5.
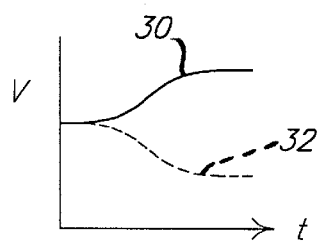
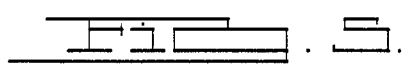
FIG. 5a.
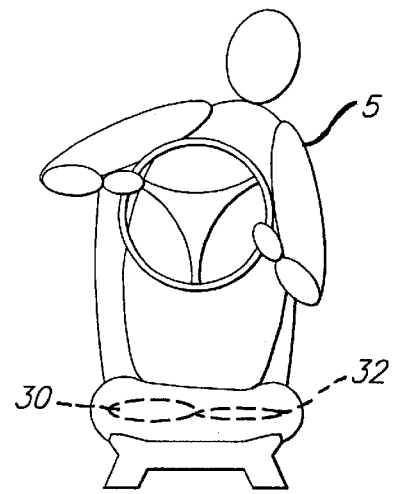
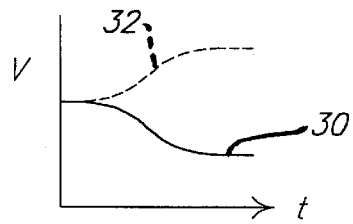
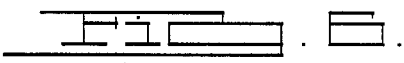
FIG. 6.
FIG. 6a.
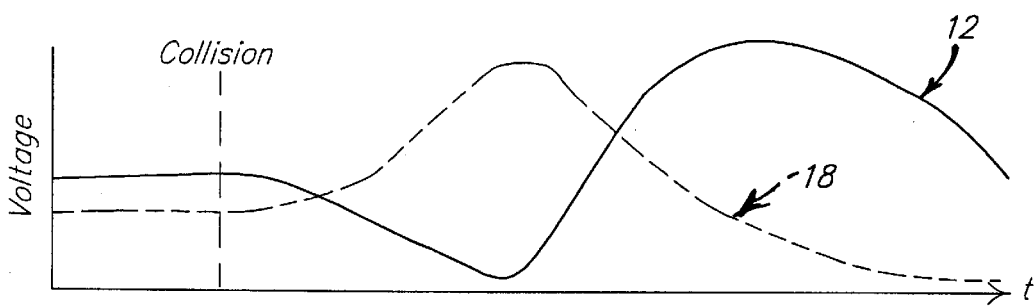
FIG. 8.

AUTOMOTIVE SEAT WEIGHT SENSING SYSTEM

CROSS-REFERENCE TO RELATED APPLICATIONS

The instant application claims the benefit of U.S. Provisional Application Ser. No. 60/034,018 filed on Jan. 8, 1997.

Co-pending U.S. application Ser. No. 08/933,701, hereinafter "Application ASL-157-US", entitled "Seat Weight Sensor Having Fluid Filled Bladder", filed on Dec. 18, 1997 claiming benefit of U.S. Provisional Application Ser. No. 60/032,380 filed on Dec. 19, 1996, and assigned to the assignee of the instant invention discloses a hydrostatic weight sensor comprising a fluid filled bladder and a pressure sensor for sensing the weight of an occupant in a vehicle seat for controlling a safety restraint system. Application ASL-157-US also discloses a load distributor for distributing loads across the load bearing surface of the hydrostatic weight sensor.

Co-pending U.S. application Ser. No. 09/003,870, hereinafter "Application ASL-163-US", entitled "Vehicle Seat Sensor Having Self-Maintaining Air Bladder", filed on Jan. 7, 1998, claiming benefit of U.S. Provisional Application Ser. No. 60/035,343 filed on Jan. 16, 1997, and assigned to the assignee of the instant invention discloses an apparatus for automatically maintaining the supply of sensing fluid in a hydrostatic weight sensor.

Co-pending U.S. application Ser. No. 09/003,851, hereinafter "Application ASL-185-US", entitled "Seat Weight Sensor Having Self-Regulating Fluid Filled Bladder", filed on Jan. 7, 1998 claiming benefit of U.S. Provisional Application Ser. No. 60/058,086 filed on Sep. 5, 1997, and assigned to the assignee of the instant invention discloses a hydrostatic weight sensor having a means for automatically regulating the amount of sensing fluid therein.

Co-pending U.S. application Ser. No. 09/003,868, hereinafter "Application ASL-186-US", entitled "Seat Weight Sensor with Means for Distributing Loads", filed on Jan. 7, 1998 claiming benefit of U.S. Provisional Application Ser. No. 60/058,084 filed on Sep. 5, 1997, and assigned to the assignee of the instant invention discloses a load distributor for distributing sensed load across the load bearing surface of a hydrostatic weight sensor.

Co-pending U.S. application Ser. No. 09/003,673, hereinafter "Application ASL-187-US", entitled "Seat Weight Sensor Having Self-regulating Fluid Filled Bladder", filed on Jan. 7, 1998 claiming benefit of U.S. Provisional Application Ser. No. 60/058,119 filed on Sep. 5, 1997, and assigned to the assignee of the instant invention discloses a hydrostatic weight sensor having a means for automatically regulating the amount of sensing fluid therein.

Co-pending U.S. application Ser. No. 09/003,850, hereinafter "Application ASL-193-US", entitled "Altitude/ Temperature Compensation for a Gas-Filled Weight Sensor", filed on Jan. 7, 1998 claiming benefit of U.S. Provisional Application Ser. No. 60/065,334 filed on Nov. 13, 1997, and assigned to the assignee of the instant invention discloses a hydrostatic weight sensor comprising a pair of hydrostatic weight sensors in series with one another but having a different sensitivity with respect to variations in temperature or ambient pressure.

Co-pending U.S. application Ser. No. 09/003,746, hereinafter "Application ASL-194-US", entitled "Seat Weight Sensor Using Fluid Filled Tubing", filed on Jan. 7, 1998 claiming benefit of U.S. Provisional Application Ser. No. 60/065,986 filed on Nov. 17, 1997, and assigned to the assignee of the instant invention discloses a hydrostatic weight sensor incorporating a fluid filled tube.

Co-pending U.S. application Ser. No. 09/003,744, hereinafter "Application ASL-195-US", entitled "Low Profile Hydraulic Seat Weight Sensor", filed on Jan. 7, 1998 claiming benefit of U.S. Provisional Application Ser. No. 60/065, 832 filed on Nov. 17, 1997, and assigned to the assignee of the instant invention discloses a hydrostatic weight sensor constructed from plates or sheets of semi-rigid material and filled with a liquid, grease, Bingham fluid or thixotropic material.

All of the above referenced U.S. Applications and U.S. Provisional Applications are incorporated herein by reference.

TECHNICAL ART

The instant invention generally relates to sensors and systems for measuring weight and more particularly to a weight sensor for measuring the weight of occupants and other objects in a motor vehicle seat such as useful for determining occupant seating conditions for controlling a vehicle safety restraint system.

BACKGROUND OF THE INVENTION

A vehicle may contain automatic safety restraint actuators which are activated responsive to a vehicle crash for purposes of mitigating occupant injury. Examples of such restraint actuators include air bags, seat belt pretensioners, and deployable knee bolsters.

One objective of an automatic safety restraint system is to mitigate occupant injury, thereby not causing more injury with the automatic restraint system than would be caused by the crash had the automatic restraint system not been activated. Notwithstanding the protective benefit of these automatic safety restraint actuators, there is generally both a risk and a cost associated with the deployment thereof. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

While air bags are designed to protect vehicle occupants, conventional crash detection and safety restraint deployment systems only use sensors which are mounted on the vehicle frame and are triggered by acceleration or velocity of the car rather than the occupant. Accordingly, conventional deployment strategies are not directly based on the weight, stature, and position of vehicle occupants. It is often very difficult to discriminate between crashes where air bags should be deployed and when their deployment could cause more harm than benefit. This difficult decision is typically made using only one or as few as possible sensors mounted on the vehicle. In the future, more occupant safety strategies will be available, including seat belt pre-tensioning and multi-stage air bags. With more available options, the deployment decision will become more complicated and require additional real-time occupant position data.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants at greater risk for injury when exposed to higher severity crashes.

Another technique for mitigating injury to occupants by the air bag inflator is to control the rate of inflation or the capacity of the inflator responsive to a measure of the severity of the crash. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the air bag inflator responsive to the presence, position, and size of the occupant, or to the severity of the crash. For example, the air bag inflator can be disabled if the occupant weight is below a given threshold. Moreover, the inflation capacity can be adjusted by controlling the number of inflation stages of a multi-stage inflator that are activated. Furthermore, the inflation power can be adjusted by controlling the time delay between the firings of respective stages of a multi-stage inflator.

One measure of restraint capacity of an air bag inflator is the amount of occupant kinetic energy that can be absorbed by the associated air bag system, whereby when the occupant collides with the gas filled air bag, the kinetic energy of the occupant is converted to potential energy via the pressurization of the air bag, and this potential energy is dissipated by venting pressurized gases from the air bag. As a vehicle in a crash is decelerated, the velocity of an unrestrained occupant relative to the vehicle increases. Preferably, the occupant restraint process is commenced early in the crash event so as to limit the amount of occupant kinetic energy which must be absorbed and thereby minimize the associated restraint forces and accelerations of and loads within the occupant. If the occupant were a simple inertial mass without friction relative to the vehicle, the kinetic energy of the occupant would be given by $\frac{1}{2} M.V^2$, where M is the mass of the occupant and V is the occupant velocity relative to the vehicle. If a real occupant were represented by an interconnected set of bodies, some of which have friction relative to the vehicle, each body of which may have differing velocities relative the vehicle, the above equation would apply to the motion of the center of gravity of the occupant. Regardless of the representation, occupants of larger mass will have a larger kinetic energy for the same velocity relative to the vehicle. Therefore, an occupant weight sensor is useful in an air bag system with variable restraint capacity to enable the restraint capacity to be preferentially adapted to the weight, or mass, of the occupant.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. Occupant presence can be detected by a seat weight sensor adapted to provide either a continuous measure of occupant weight or to provide a binary indication if the occupant weight is either above or below a specified weight threshold.

Known seat weight sensors comprise one or more pads employing force sensitive resistive (FSR) films. These arrangements are typically used as weight threshold systems to disable a passenger air bag when the seat is empty. Load cells attached to the seat mounting posts have also been used in research applications. Mechanisms which use string based potentiometers to measure downward seat displacement have also been investigated.

Such known arrangements suffer from several drawbacks. First, variable resistance force sensors have limited sensitivity and in some situations are not sensitive enough to put directly under a seat pad while still achieving the desired response. Second, the threshold weight system provides only very limited information. For example, such arrangements provide no indication as to the size of an occupant. Third, the resistance values of known variable force resistors change with temperature, and are subject to drift over time with a constant load on the sensor.

Furthermore, other known sensing arrangements do not otherwise provide suitable results. For example, the use of load cells is prohibitively expensive for large-scale commercial applications. Strain gauges of any type may be impractical because of the difficulty in applying them to the strained material. Mechanical string potentiometer based weight sensors are complex, and subject to failure from stretching of the string. String potentiometer based weight sensors also suffer from a limitation whereby seat geometry changes over the lifetime of the seat. More specifically, seats tend to take a "set" over time so that the springs and cushion tend to move downward as the seat ages. A string potentiometer based weight sensor measuring downward displacement would require periodic recalibration over the lifetime of the seat. Finally, optical or infrared sensors have been used to measure the spatial position of occupants relative to the dashboard or headliner. Often these sensors are also integrated with speed sensors to discern changes in occupant position due to car acceleration. Current optical and infrared occupant position sensors require augmented information from speed and weight sensors, thereby resulting in a relatively high cost distributed system which may be difficult to manufacture, install, and maintain. Furthermore, optical and/or infrared sensors which measure the range from the headliner or dashboard can be confused by placement of objects in front of an occupant, such as when reading newspapers or books, or by the position of the seat back because many seats can recline fully back and incline fully forward. Moreover, the sensing aperture of these sensors may become occluded by inadvertent scratching or substance application.

Known seat weight sensing techniques generally require multiple points for sensing distributed weight accurately.

Also, force sensing resistors, load cells or membrane switches may require significant seat redesign for use in current or future seats. This is particularly true for spring type seats which do not provide a uniform horizontal support surface. The response time of load cells or membrane switches may not be fast enough for real-time applications.

The prior art also teaches the use of seat weight sensors outside the automotive environment, for example as a means for disabling the activation of either a boat or an industrial machine if the operator is not properly seated, or for weighing a person seated on an exercise bike. These devices employ pneumatic bladders located in the seat, whereby the pressure within the bladder is used to either activate a threshold switch or to provide a continuous indication of occupant weight.

One problem with prior art pneumatic sensors, particularly when applied to the automotive environment, is their sensitivity to environmental conditions, particularly to ambient temperature and pressure. This requires the bladder to be partially filled with fluid under ambient conditions of lower temperature or higher pressure, thereby making the bladder more susceptible to bottoming out when exposed to localized or concentrated loads and therefor requiring a means for distributing the loads over the load bearing area of the bladder. Pneumatic seat weight sensors can be sensitive to the amount of air initially in the associated bladder. A seat weight sensor in an automotive environment must function reliably and accurately over a wide range of temperatures and pressures which can cause significant errors.

Another problem with a pneumatic seat weight sensor is that the sensor bladder must be sufficiently thick to prevent the top and bottom surfaces of the bladder from compressing against one another responsive to a sufficiently great localized or concentrated load under conditions when the bladder has a relatively small amount of gas, such as would occur when the bladder is filled at low pressure or high temperature.

Yet another problem with a pneumatic seat weight sensor is that a gas filled bladder is also prone to loss of fluid by leakage or osmosis, which necessitates a means for replenishing the working fluid of the bladder over the life of operation.

The prior art also teaches the use of hydraulic load cells, wherein the weight to be measured acts upon a piston element of known area, whereby the measured weight is found by multiplying a measured pressure times the known area. One problem with hydraulic load cells in the automotive environment, particularly in a seat, is that the effects of load cell orientation on hydraulic head can introduce load measurement errors.

SUMMARY OF THE INVENTION

The present invention overcomes the above-noted problems by providing a seat weight sensing system which determines the weight, stature, and distribution of occupant weight on an automobile seat and seat back prior to and during a frontal, side, or rear-end collision. This sensor data can be used to augment conventional crash detection data such as generated by an accelerometer to optimize air bag deployment and minimize or avoid occupant injury.

In accordance with the instant invention, a hydrostatic weight sensor comprises a deformable confinement that contains a fluid, wherein the deformable confinement may constitute either a distinct chamber, or one chamber of a multi-chamber deformable confinement. The hydrostatic weight sensor further comprises either a pressure sensor operatively coupled to the deformable confinement for sensing the pressure of the fluid contained therein, or a means for operatively coupling a pressure sensor to the deformable confinement. The hydrostatic weight sensor may also comprise one or more of the following elements: 1) a means for replenishing the fluid within the deformable confinement, 2) a means for releasing excessive fluid from the deformable confinement, or 3) a means for regulating the amount of fluid within the deformable confinement. The fluid contained by the deformable confinement may comprise either a gas, a liquid, a Bingham fluid, or a thixotropic material. Various types of pressure sensors may be incorporated into or associated with the hydrostatic weight sensor in accordance with the instant invention. For example, the pressure sensor may sense either the absolute pressure of the fluid within the deformable confinement, or the difference between the pressure thereof and the local atmospheric pressure. Furthermore, the pressure sensor may be either internal or external to the hydrostatic weight sensor, may be integrated therewith or separated therefrom, and may operate on any principles known to one of ordinary skill in the art, including the measurement of strain in the surface of the deformable confinement, or the measurement of pressure through the surface of the deformable confinement whereby the pressure sensor is isolated thereby from the fluid. Examples of various hydrostatic weight sensors in accordance with the instant invention are disclosed hereinbelow and in Applications ASL-157-US, ASL-163-US, ASL-185-US, ASL-187-US, ASL-193-US, ASL-194-US, and ASL-195-US referenced hereinabove and incorporated herein by reference.

In further accordance with the instant invention, a load distributor comprises a means for distributing the load applied to a hydrostatic weight sensor across one or more load bearing surfaces of the hydrostatic weight sensor. A hydrostatic weight sensor is preferably partially filled with fluid, particularly for fluids such as gases that are subject to expansion under the influence of ambient temperature and pressure conditions. A partially filled hydrostatic weight sensor is susceptible to bottoming out under the influence of concentrated loads unless a means is provided for distributing the applied load across the load bearing surfaces of the hydrostatic weight sensor. The seat cushion inherently acts as a load distributor but is subject to localized deformation under the influence of loads that are sufficiently great or sufficiently concentrated. A load distributor preferably is both sufficiently rigid to prevent concentrated loads from causing localized deformations of sufficient magnitude to locally collapse the hydrostatic weight sensor, and sufficiently flexible so as to not interfere with seating comfort. Examples of various load distributors in accordance with the instant invention are disclosed in Applications ASL-157 and ASL-186 referenced hereinabove and incorporated herein by reference.

In accordance with one aspect of the instant invention, a hydrostatic weight sensor is provided in a vehicle seat, wherein a bladder is formed within the cushion of the seat, as for example by molding the seat cushion with an internal cavity or by bonding mating pieces of seat cushion material together whereby each piece is scalloped in the bonding plane so that when the mated pieces are bonded together, the scalloped regions of the seat cushion material form an internal cavity. The cavity is filled with a fluid, which is preferably air. A pressure sensor operatively coupled to the internal cavity senses the pressure of the fluid therein, whereby a load applied to the seat cushion deforms the cavity thereby decreasing the associated volume and increasing the pressure of the fluid therein, responsive to the magnitude of the applied load. The weight of the applied load is measured by an associated signal processor responsive to the signal from the pressure sensor.

In accordance with another aspect of the instant invention, a hydrostatic weight sensor system is provided for sensing the weight on an occupant in a vehicle seat, wherein a bladder is formed from a flexible material and further comprises a plurality of distinct chambers, each of which contains a fluid and each of which is operatively coupled to an associated pressure sensor that senses the pressure of the fluid in the associated chamber. The pressure sensors preferably sense the difference between the pressure of the fluid and the local atmospheric pressure. The hydrostatic weight sensor system is incorporated in the vehicle seat, preferably below the seat cushion foam. The pressure of the fluid in each chamber is responsive to the associated component of occupant weight that is supported by the associated chamber of the bladder, whereby the associated plurality of pressure measurements provides a measure of the distribution of occupant weight on the seat, which is useful for calculating the position or stature of the occupant on the vehicle seat.

In accordance with yet another aspect of the instant invention, a plurality of hydrostatic weight sensors are incorporated in the base of the vehicle seat proximate one another so as to provide an associated plurality of pressure measurements, whereby each associated pressure measurement is responsive to the component of weight supported by the associated hydrostatic weight sensor. The occupant weight distribution within the seat is determined from the plurality of pressure measurements, from which the associated occupant position is calculated. For example, the hydrostatic seat weight sensors may be either laterally or longitudinally proximate one another so as to sense either the lateral or longitudinal distribution of occupant weight respectively from which the respective lateral or longitudinal occupant position is calculated. Furthermore, the overall weight applied to the seat can be calculated as the sum of the weight components sensed from the separate hydrostatic weight sensors.

In accordance with yet another aspect of the instant invention, a plurality of hydrostatic weight sensors are incorporated in a vehicle seat, whereby at least one of the hydrostatic weight sensors is located in the seat bottom, and at least another of the hydrostatic weight sensors is located in the seat back, whereby the stature or position of the occupant is calculated from the separate weight measurements.

The instant invention provides a means for sensing an occupant's weight and weight distribution so as to enable the associated control of a safety restraint system. The weight distribution information can be used to determine the occupant's position on the seat. The instant invention also provides a means for distinguishing rear or forward facing infant seats, and small occupants from full size adults.

The system of the instant invention can be easily and economically manufactured and installed in most existing or future seat designs, such as pan or spring, by merely modifying the size, shape or number of hydrostatic weight sensors. The hydrostatic weight sensor integrated into the seat bottom constantly monitors absolute weight of the occupant, while the combination of this sensor and the hydrostatic weight sensor located in the seat back are used to correlate loading signals. These signals are used to determine if an occupant is sitting forward or leaning back. By utilizing additional laterally proximate hydrostatic weight sensors, the instant invention can determine an occupant's lateral weight distribution. This information can be used to measure an occupant's position profile prior to and during a frontal, side, or rear-end crash to determine if and when primary and/or secondary safety devices such as seat pre-tensioners and multi-stage air bags should be deployed.

Accordingly, one object of the instant invention is to provide an improved seat weight sensor that can sense the distribution of weight of the seat loading.

A further object of the instant invention is to provide an improved seat weight sensor that can sense the position of the occupant on the seat.

A yet further object of the instant invention is to provide an improved seat weight sensor that can sense the stature of the occupant on the seat.

A yet further object of the instant invention is to provide an improved seat weight sensor that provides a consistent and accurate measure of the seat loading independent of the location of the source of weight on the seat.

A yet further object of the instant invention is to provide an improved seat weight sensor that provides a consistent and accurate measure of the seat loading independent of the size and distribution of the source of weight on the seat.

A yet further object of the instant invention is to provide an improved seat weight sensor that provides a consistent and accurate measure of the seat loading independent of the amount of weight on the seat.

A yet further object of the instant invention is to provide an improved seat weight sensor that operates under a wide range of ambient temperature and pressure conditions.

A yet further object of the instant invention is to provide an improved seat weight sensor that can distinguish between a rear facing infant seat, for which an air bag system is preferably not deployed, and other occupants for which an air bag system is preferably deployed in the event of a crash of sufficient severity.

A yet further object of the instant invention is to provide an improved seat weight sensor that can be incorporated into an intelligent safety restraint system for which the preferable mode of the activation of a controllable occupant restraint system is dependent upon the weight of the occupant.

A yet further object of the instant invention is to provide an improved seat weight sensor that is inexpensive to produce.

In accordance with these objectives, one feature of the instant invention is a fluid filled bladder formed within the seat cushion.

Another feature of the instant invention is a fluid filled bladder comprising a plurality of distinct chambers.

Yet another feature of the instant invention is a pressure sensor operatively coupled to the fluid filled bladder for measuring the pressure therein.

Yet another feature of the instant invention is a differential pressure sensor operatively coupled to the fluid filled bag for measuring the pressure therein relative to local atmospheric pressure.

Yet another feature of the instant invention is the incorporation of a gas as the fluid in the fluid filled bladder.

Yet another feature of the instant invention is the incorporation of a plurality of hydrostatic weight sensors in the seat.

Yet another feature of the instant invention is the incorporation of a plurality of hydrostatic weight sensors in the seat bottom.

Yet another feature of the instant invention is the incorporation of at least one hydrostatic weight sensor in the seat bottom, and at least another hydrostatic weight sensor in the seat back.

Yet another feature of the instant invention is the incorporation of a signal processor for sensing the weight, position or stature of the occupant from the plurality of pressure measurements from the associated plurality of hydrostatic weight sensors.

The specific features of the instant invention provide a number of associated advantages. One advantage of the instant invention with respect to the prior art is that the plurality of hydrostatic weight sensors within the base of the seat provides a means for determining the position of the occupant on the seat.

Another advantage of the instant invention is that the plurality of hydrostatic weight sensors respectively in the seat bottom and the seat back provides a means for determining the stature and position of the occupant on the seat.

Yet another advantage of the instant invention is that the hydrostatic weight sensor comprising a bladder with a plurality of chambers provides a means for determining the position of the occupant on the seat.

Yet another advantage of the instant invention is that plurality hydrostatic weight sensors provides a measure of occupant position and stature which can be used to control the activation of a safety restraint system to improve the performance thereof.

Accordingly, the instant invention provides a system and method for sensing the distribution of weight on a vehicle seat, from which the position and stature of an occupant seated thereon can be determined and used to control the activation of a safety restraint system.

The instant invention will be more fully understood after reading the following detailed description of the preferred embodiment with reference to the accompanying drawings. While this description will illustrate the application of the instant invention in an automotive safety restraint system, it will be understood by one with ordinary skill in the art that the instant invention can also be applied to other systems for sensing weight and weight distributions.

BRIEF DESCRIPTION OF THE DRAWINGS

FIG. 1 illustrates the hydrostatic weight sensor system in accordance with one aspect of the instant invention.

FIG. 2 illustrates the signals from the pressure sensors of respective hydrostatic weight sensors corresponding to seat loading configurations illustrated in FIGS. 3a, 3b, and 3c, in accordance with one aspect of the instant invention.

FIG. 3a illustrates the unloaded state corresponding to FIG. 2, in accordance with one aspect of the instant invention.

FIG. 3b illustrates a loading transition corresponding to FIG. 2, in accordance with one aspect of the instant invention.

FIG. 3c illustrates the static loading state corresponding to FIG. 2, in accordance with one aspect of the instant invention.

FIG. 5 illustrates a loading configuration with the occupant leaning right in accordance with a second aspect of the instant invention.

FIG. 5a illustrates the pressure sensor signals from the laterally proximate hydrostatic weight sensors corresponding to the loading configuration of FIG. 5, in accordance with a second aspect of the instant invention.

FIG. 6 illustrates a loading configuration with the occupant leaning left in accordance with a second aspect of the instant invention.

FIG. 6a illustrates the signals from the pressure sensors of the laterally proximate hydrostatic weight sensors corresponding to the loading configuration of FIG. 6, in accordance with a second aspect of the instant invention.

FIG. 8 illustrates the signals from the pressure sensors of respective hydrostatic weight sensors corresponding to a seat loading event resulting from a rear-end collision corresponding to FIGS. 7a, 7b, 7c, 7d and 7e, in accordance with a third aspect of the instant invention.

FIG. 9 illustrates an environment of the instant invention, in accordance with a fourth aspect of the instant invention.

DETAILED DESCRIPTION OF THE PREFERRED EMBODIMENT(S)

Figure 7A:
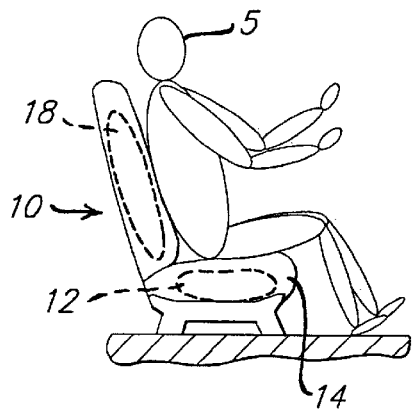
FIG. 7a illustrates a first stage of loading of the hydrostatic weight sensor resulting from a rear-end collision, in accordance with a third aspect of the instant invention.
Figure 7B:
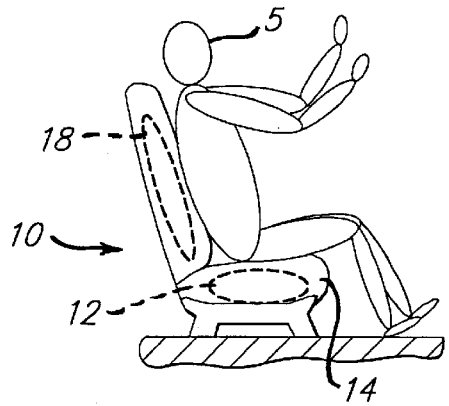
FIG. 7b illustrates a second stage of loading of the hydrostatic weight sensor resulting from a rear-end collision, in accordance with a third aspect of the instant invention
Figure 7C:
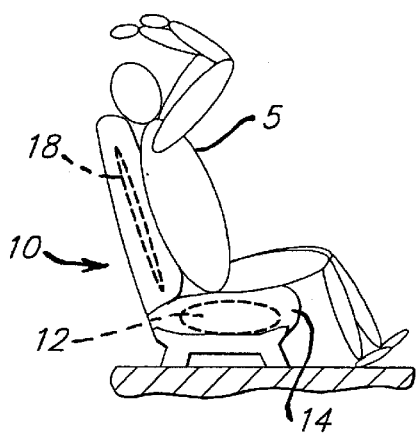
FIG. 7c illustrates a third stage of loading of the hydrostatic weight sensor resulting from a rear-end collision, in accordance with a third aspect of the instant invention
Figure 7D:
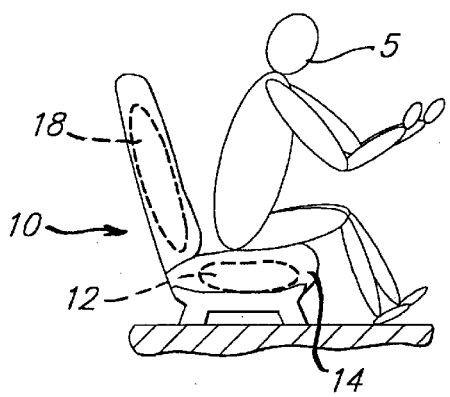
FIG. 7d illustrates a fourth stage of loading of the hydrostatic weight sensor resulting from a rear-end collision, in accordance with a third aspect of the instant invention
Figure 7E:
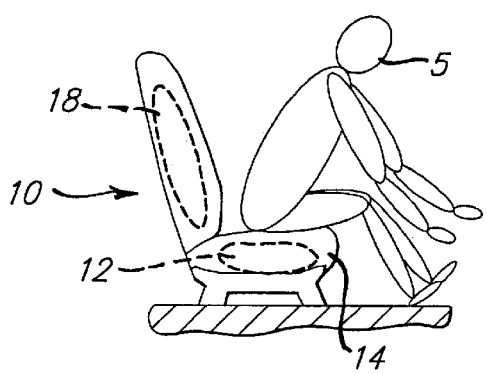
FIG. 7e illustrates a fifth stage of loading of the hydrostatic weight sensor resulting from a rear-end collision, in accordance with a third aspect of the instant invention

Referring to FIG. 1, a hydrostatic weight sensor system 10 in accordance with one aspect of the instant invention comprises at least one hydrostatic weight sensor 12 positioned under a foam seat bottom cushion 14 in a seat bottom 40 on a vehicle seat base 16, and at least one hydrostatic weight sensor 18 positioned under a foam seat back cushion 20 in a seat back 27. Each hydrostatic weight sensor 12 and 18 incorporates respective pressure sensor 22 and 24 respectively connected to a signal processor 26.

The pressure within the hydrostatic weight sensor 18 relative to atmospheric pressure gives an estimate of the occupant weight that is supported by the seat back 27 so as to determine if an occupant 5 is leaning forward or back. The hydrostatic weight sensors 12 and 18 are preferably partially filled with fluid so as to accommodate changes in pressure due to altitude and temperature.

Referring to FIG. 2, the pressure sensors 22 and 24 generate respective voltage signals that are proportional to applied pressure and linear over the full range of expected occupant loading. The pressure sensor voltage outputs are fed to the signal processor 26 for calculating occupant weight, weight distribution, and position therefrom, for example by comparing the measured pressure signals with pre-stored thresholds.

Referring to FIGS. 2, 3a, 3b and 3c, when an occupant 5 or object is placed in the seat, the pressure of the fluid in the respective hydrostatic weight sensors 12 and 18 sensed by the respective pressure sensors 22 and 24 increases responsive thereto. The outputs from the respective pressure sensors 22 and 24 are dependent upon the location and orientation of the occupant 5. When an occupant 5 or object shifts loading such as by moving forward, backward, and side to side, the respective pressure transducer signals change responsive thereto. The signal processor 26 calculates and stores the occupant weight, position, and stature by correlating the signals from the hydrostatic weight sensor 12 located in the seat bottom with the hydrostatic weight sensor 18 located in the seat back 27.

The signal processor 26 controls the safety restraint system, such as an air bag or a seat belt pretensioner, responsive to the occupant weight, position, and stature measurements and position time history so as to mitigate injury to the occupant 5 that might otherwise result in an uncontrolled safety restraint system if, for example, the occupant 5 were too close to a deploying air bag during a vehicle crash.

Figure 9A:
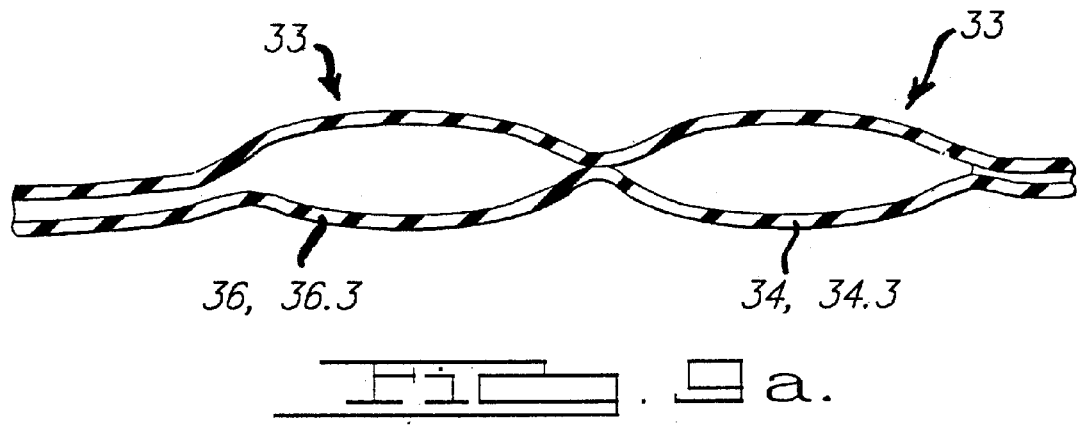
FIG. 9a illustrates a plurality of distinct chambers within a common bladder in accordance with the instant invention.

Referring to FIG. 9, a hydrostatic weight sensor system 10a in accordance with a second aspect of the instant invention comprises a plurality of hydrostatic weight sensors 34 and 36—as either distinct sensor elements as illustrated in FIG. 5, or as distinct chambers 34.3, 36.3 within a common bladder-positioned 33 as illustrated in FIG. 9a, longitudinally proximate one another, fore and aft respectively, under a foam seat bottom cushion 14 on a vehicle seat base 16. Each hydrostatic weight sensor 34 and 36 incorporates respective differential pressure sensors 35 and 37 respectively connected to a signal processor 26. The differential pressure sensors 35 and 37 respectively measure the pressure differentials between the respective hydrostatic weight sensors, 34 and 36, and the atmosphere 25.

In operation, an occupant 5 seated on the seat bottom 40 of seat 3 causes the pressure inside a hydrostatic weight sensor 34 to increase such that that product of the differential pressure, as sensed by differential pressure sensor 35, multiplied times the area of the base 34.1 of the bladder of the hydrostatic seat weight sensor 34 is substantially equal to the component of occupant weight distributed by the foam of the seat bottom cushion 14 over the top 34.2 of the bladder of the hydrostatic seat weight sensor 34. Similarly, the occupant 5 seated on the seat bottom 40 of seat 3 causes the pressure inside a hydrostatic weight sensor 36 to increase such that that product of the differential pressure, as sensed by differential pressure sensor 37, multiplied times the area of the base 36.1 of the bladder of the hydrostatic seat weight sensor 36 is substantially equal to the component of occupant weight distributed by the foam of the seat bottom cushion 14 over the top 36.2 of the bladder of the hydrostatic seat weight sensor 36. A load distributor 42 may be located adjacent to either the top 34.2, 36.2 (as illustrated in FIG. 9) or bottom 34.1, 36.1 surfaces of the bladders of the respective hydrostatic weight sensors 34, 36 to distribute the loads thereupon so as to prevent localized bottoming out of the top 34.2, 36.2 and bottom 34.1, 36.1 surfaces responsive to concentrated loadings. The respective pressure signal outputs 38 and 39 from respective differential pressure sensors 35 and 37 are operatively coupled to the signal processor 26 which converts the respective pressure signal outputs 38 and 39 to a measure of occupant weight using known analog, digital, or microprocessor circuitry and software. More particularly, the total occupant weight is calculated as the sum of the respective weight components, and the position of the occupant is calculated as the center of loading of the weight components based upon the known locations of the respective hydrostatic weight sensors 34 and 36. A crash sensor 60 is also operatively coupled to the signal processor 26. Responsive to a crash detected by the crash sensor 60, and further responsive to the sensed weight and position of the occupant 5 as transformed from the pressure signal outputs 38 and 39, the signal processor 26 generates a signal 80 which is operatively coupled to one or more initiators 90 of one or more gas generators 100 mounted in an air bag inflator module 110, thereby controlling the activation of the air bag inflator module assembly 7 so as to inflate the air bag 120 as necessary to protect the occupant 5 from injury which might otherwise be caused by the crash. The electrical power necessary to carry out these operations is provided by a source of power 70, preferably the vehicle battery.

Figure 4:
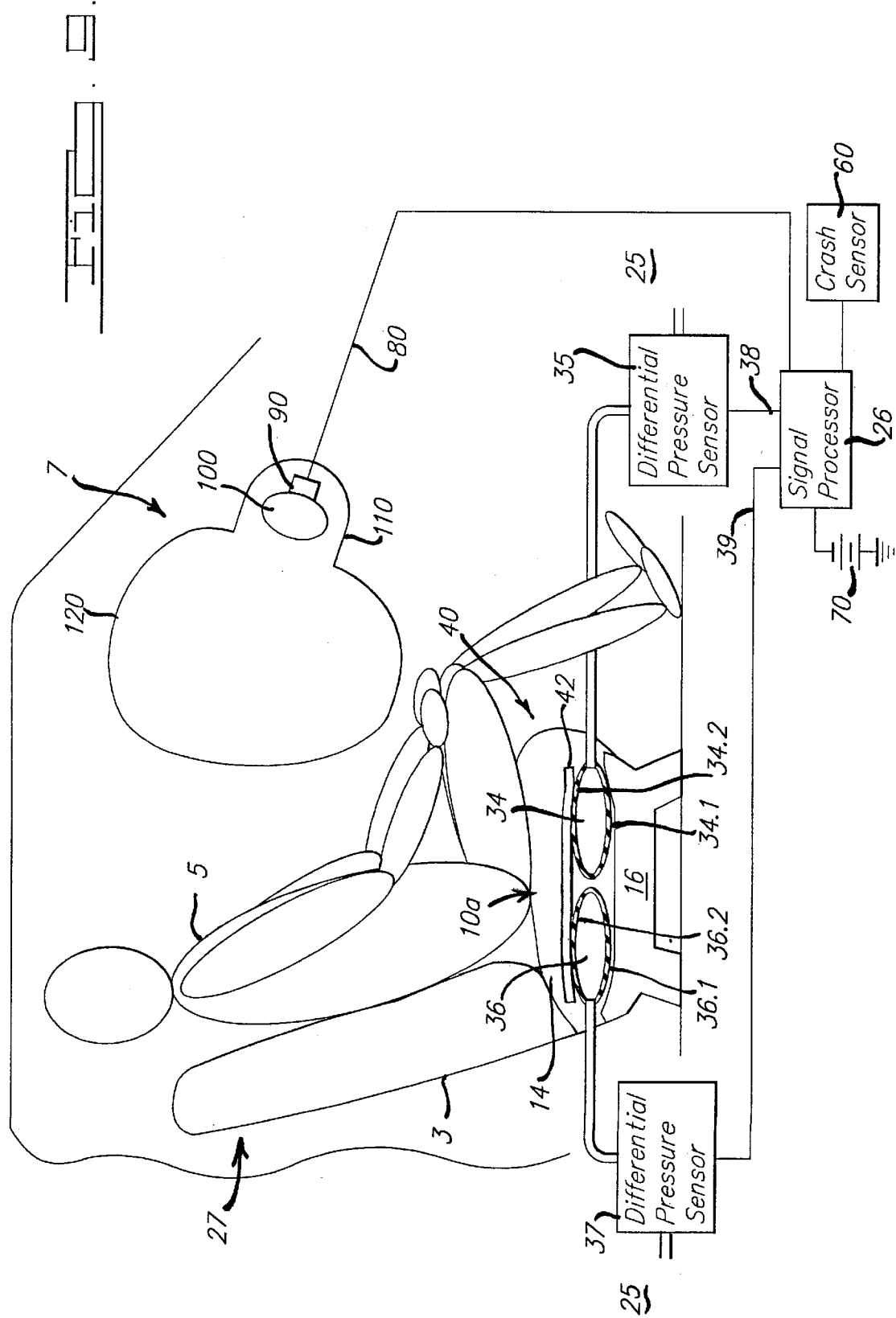
FIG. 4 illustrates the unloaded state in accordance with a second aspect of the instant invention.

Referring to FIG. 4, in a third aspect of the instant invention, a second hydrostatic weight sensor system 28 with two laterally adjacent compartments 30 and 32 is placed on top of the first hydrostatic weight sensor 12. Alternately, the second hydrostatic weight sensor system 28 could be implemented as distinct hydrostatic weight sensors 30.1 and 32.1. Referring to FIG. 5, as the occupant 5 moves to the occupant's right, a larger component of load is placed upon compartment 30 than compartment 32, resulting in a corresponding change in the outputs of the associated pressure sensors as seen in FIG. 5a. Similarly, referring to FIG. 6, as the occupant 5 moves to the occupant's left, a larger component of load is placed upon compartment 32 than compartment 30, resulting in a corresponding change in the outputs of the associated pressure sensors as seen in FIG. 6a. Therefore, the side-to-side weight distribution of the occupant 5 can be determined by measuring the sign and magnitude of the relative pressure between the two laterally adjacent compartments 30 and 32.

In a fourth aspect of the instant invention, the hydrostatic weight sensor system 10 of the instant invention is used to determine the stature of the occupant for purposes of controlling a safety restraint system. FIGS. 7a, 7b, 7c, 7d, and 7e illustrate the progression of occupant motion resulting from a rear-end collision, and FIG. 8 illustrates the corresponding signals from the respective hydrostatic weight sensors 12 and 18 located under the seat bottom 40 and seat back 27 respectively. Following the collision, the hydrostatic weight sensor 18 in the seat back 27 initially experiences a large loading due to the occupant's rearward reaction force backward against the seat back 27. Then, the occupant 5 is accelerated forward responsive to a rebound from the seat back 27, which shifts weight back onto the seat bottom cushion 14, thereby increasing the loading of the hydrostatic weight sensor 12 located on the seat base 16. This forward acceleration could cause occupant 5 to collide with the dashboard or the steering wheel. The combined sensor responses from hydrostatic weight sensors 12 and 18 provide a crash "signature" which is responsive to occupant weight and stature, and which is used, along with prior position and weight data, to determine if and when seat belt pre-tensioning or air bag deployments (primary or secondary) are required so as to provide optimal occupant protection.

Figure 10:
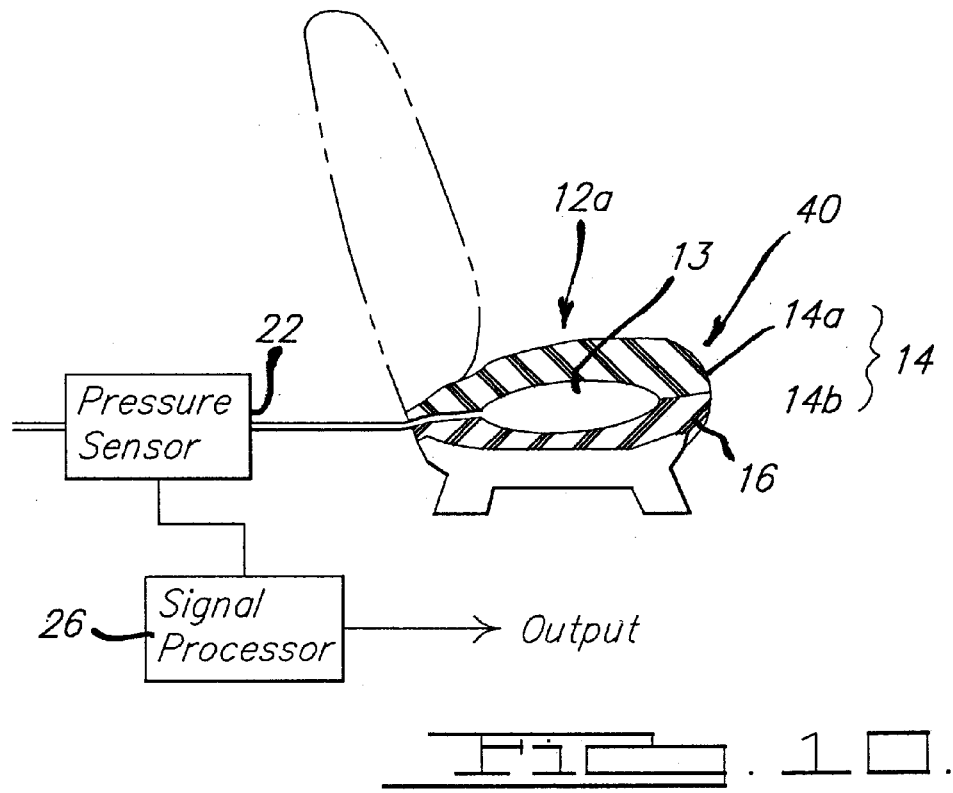
FIG. 10 illustrates another aspect of the instant invention wherein a bladder is formed from the cushion of the seat.

Referring to FIG. 10, in a fifth aspect of the instant invention, a hydrostatic weight sensor 12a is provided by forming an associated bladder 13 from the seat bottom cushion 14, either by molding the seat bottom cushion 14 with an internal cavity that constitutes the bladder 13 or by scalloping the mating surface of top 14a and bottom 14b halves of the seat bottom cushion 14, and then bonding these halves together so that the mating scalloped portions thereby form the bladder 13 or a cavity enclosing a bladder 13.

The hydrostatic weight sensor system 10 of the present invention provides direct, real-time data on the weight, stature and position of the occupant 5. In combination with current vehicle based crash detection sensors, the instant invention provides additional real-time information about the occupant which can be used to provide better control of the activation of safety restraint systems. Furthermore, the hydrostatic weight sensor system 10 of the instant invention is inherently insensitive to obstruction by books or newspapers and to objects placed under the seat, because the hydrostatic weight sensor system 10 is incorporated within the seat.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A system for sensing an occupant on a vehicle seat, comprising:
    a. a plurality of hydrostatic weight sensors incorporated in the vehicle seat, incorporating an associated plurality of pressure sensors, each one of said plurality of pressure sensors responsive to a corresponding component of occupant weight applied by the occupant on the vehicle seat to the associated hydrostatic weight sensor; and
    b. a signal processor for measuring the position of the occupant on the vehicle seat responsive to the distribution of pressure measurements from said plurality of pressure sensors.

2. A system for sensing an occupant on a vehicle seat as recited in claim 1, wherein two or more of said plurality of hydrostatic weight sensors are proximate one another in a bottom of the seat so as to sense distinct components of occupant weight.

3. A system for sensing an occupant on a vehicle seat as recited in claim 2, wherein two or more of said plurality of hydrostatic weight sensors are laterally proximate one another in the bottom of the seat.

4. A system for sensing an occupant on a vehicle seat as recited in claim 2, wherein two or more of said plurality of hydrostatic weight sensors are longitudinally proximate one another in the bottom of the seat.

5. A system for sensing an occupant on a vehicle seat as recited in claim 1, wherein at least one of said plurality of hydrostatic weight sensors is located in a bottom of the seat, and at least another of said plurality of hydrostatic weight sensors is located in a back of the seat.

6. A system for sensing an occupant on a vehicle seat as recited in claim 1, further comprising a load distributor adjacent to at least one load bearing surface of said plurality of hydrostatic weight sensors.

7. A system for sensing an occupant on a vehicle seat as recited in claim 1, whereby said signal processor further measures the weight of the occupant on the vehicle seat responsive to the plurality of pressure measurements from said plurality of pressure sensors.

8. A system for sensing an occupant on a vehicle seat as recited in claim 7, further comprising a load distributor adjacent to at least one load bearing surface of said plurality of hydrostatic weight sensors.

9. A system for sensing an occupant on a vehicle seat and for controlling a safety restraint system responsive thereto, comprising:
    a. a plurality of hydrostatic weight sensors incorporated in the vehicle seat, incorporating an associated plurality of pressure sensors, each one of said plurality of pressure sensors responsive to a corresponding component of occupant weight applied by the occupant on the vehicle seat to the associated hydrostatic weight sensor; and
    b. a signal processor for measuring the position of the occupant on the vehicle seat responsive to the distribution of pressure measurements from said plurality of pressure sensors for generating a control signal for controlling the safety restraint system responsive to said position measurement.

10. A system for sensing the weight of an occupant on a vehicle seat, comprising:
    a. a bladder formed from a cushion of the seat;
    b. a fluid contained by said bladder;
    c. a pressure sensor operatively coupled to said bladder for generating a signal responsive to the pressure of said fluid within said bladder; and
    d. a signal processor for calculating the weight of the occupant from said signal.

11. A method of sensing an occupant on a vehicle seat, comprising:
    a. generating a plurality of signals from an associated plurality of hydrostatic weight sensors, whereby each said signal is responsive to the associated component of occupant weight applied to each of said plurality of hydrostatic weight sensors; and
    b. calculating the distribution of occupant weight on the vehicle seat from said plurality of signals.

12. A method of sensing an occupant on a vehicle seat as recited in claim 11, further comprising the operation of calculating the position of the occupant from said distribution of occupant weight.

13. A method of sensing an occupant on a vehicle seat as recited in claim 11, further comprising the operation of calculating the stature of the occupant from said distribution of occupant weight.

14. A method of sensing an occupant on a vehicle seat and for controlling a safety restraint system responsive thereto, comprising:
    a. generating a plurality of signals from an associated plurality of hydrostatic weight sensors, whereby each said signal is responsive to the associated component of occupant weight applied to each of said plurality of hydrostatic weight sensors; and
    b. generating a control signal for controlling the safety restraint system responsive to said plurality of signals.

15. A sensor for sensing the weight of an occupant in a vehicle seat, comprising:
    a. a bladder mounted beneath the cushion of the seat and supported by the base of the seat, whereby said bladder is constructed from a flexible material and further comprises a plurality of distinct chambers;
    b. a fluid contained by said bladder within each of said chambers;
    c. a plurality of pressure sensors operatively coupled to respective ones of said chambers of said bladder for generating respective signals responsive to the pressure of said fluid within said chambers of said bladder responsive to the associated component of occupant weight applied to each of said chambers of said bladder.

* * * * *